ial axis of the shield, said wires being volute with one of the volutions embedded in the material at the edge of the shield and the other volution embedded in the material in the vicinity of the middle thereof.
UNITED STATES PATENT OFFICE.

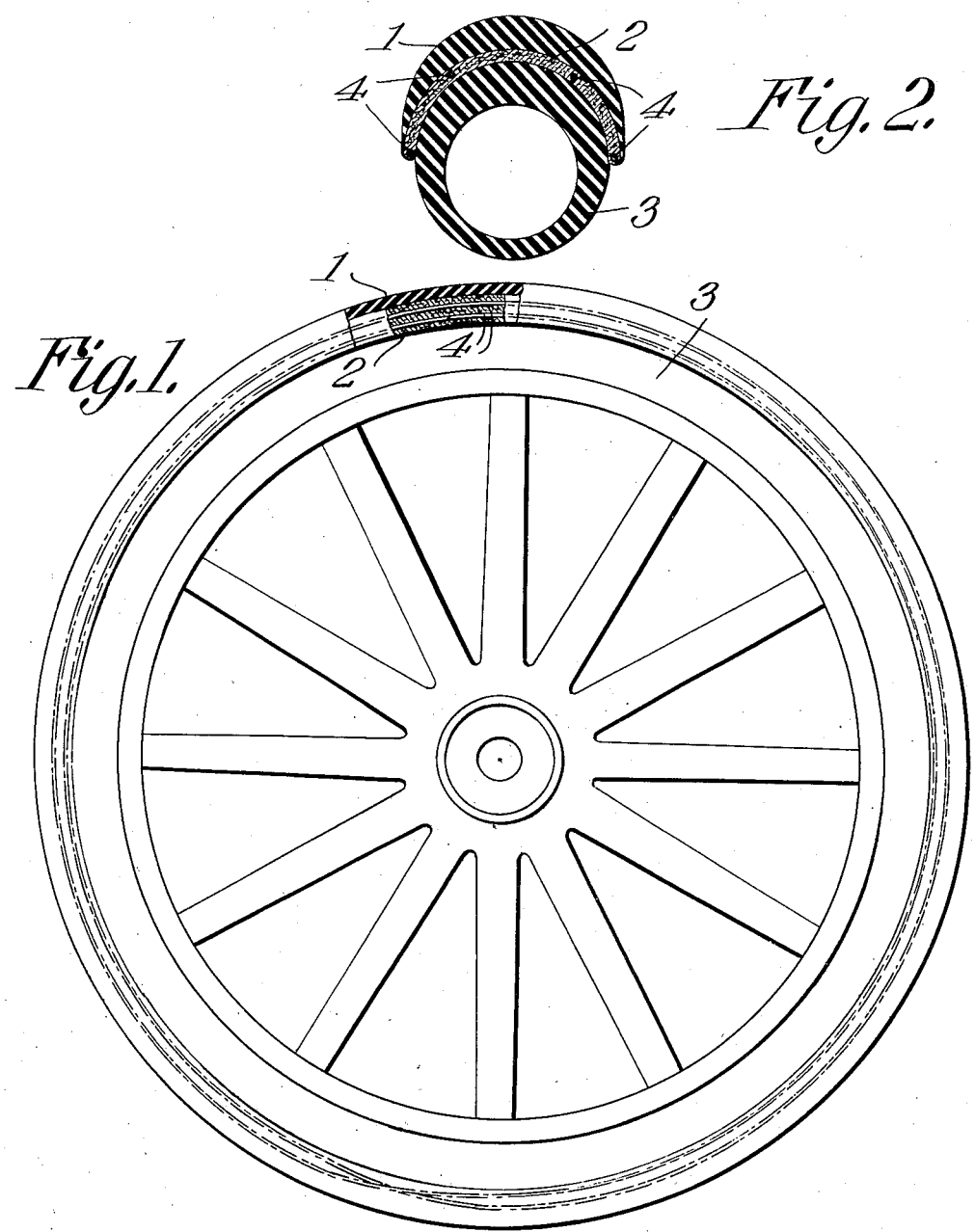

THOMAS JEFFERSON SPRINKLE, OF HILLSBORO, OHIO.

TIRE-SHIELD.

No. 865,443.   Specification of Letters Patent.   Patented Sept. 10, 1907.

Application filed September 10, 1906. Serial No. 334,013.

*To all whom it may concern:*

Be it known that I, THOMAS JEFFERSON SPRINKLE, a citizen of the United States, residing at Hillsboro, in the county of Highland and State of Ohio, have invented a new and useful Tire-Shield, of which the following is a specification.

This invention has relation to tire shields, and it consists in the novel construction and arrangement of its parts, as hereinafter shown and described.

The object of the invention is to provide a shield for flexible tires, said shield having a resilient tread provided on its inner side with a layer of fiber and rubber. A series of wires are embedded in the said layer and extend longitudinally of the shield.

In the accompanying drawing, Figure 1 is a side elevation of a wheel showing the shield applied to the tire thereof with part in section. Fig. 2 is a transverse sectional view of a portion of the tire showing the shield applied thereto.

The shield comprises the tread 1 which is crescent shaped in cross section. The said tread is made from rubber. The inner surface of the said tread is lined with a layer 2 which is composed of mixed fiber and rubber. The said layer comes in direct contact with the surface of the tire 3. The wires 4 are embedded in the layer 2 and extend longitudinally of the said shield. The said wires are located on opposite sides of the central longitudinal axis of the said shield. As shown in Fig. 1 each of the wires 4 is continuous and volute. One of the volutions of the wire is embedded in the material at the edge of the shield and the other volution is embedded in the material in the vicinity of the middle thereof.

From the foregoing description, it is obvious that a shield is provided which possesses an elastic tread and a tough resilient layer which comes in contact with the tire. Also, the wire strands afford means for positively retaining the shield upon the surface of the tire.

Having thus described the invention, what I claim as new and desire to secure by Letters Patent is:—

1. In combination with a tire, a shield, wires embedded therein and extending longitudinally of the shield and lying upon opposite sides of the longitudinal axis thereof, said wires being volute with one of the volutions embedded in the material at the edge of the shield and the other volution embedded in the material in the vicinity of the middle thereof.

2. In combination with a tire, a shield comprising a continuous rubber tread which is crescent shape in cross-section, a layer composed of a mixture of rubber and fiber lining the inner surface of the tread and continuous wires embedded in said layer and extending longitudinally of the shield and lying upon opposite sides of the longitudinal axis of the shield, said wires being volute with one of the volutions embedded in the material at the edge of the shield and the other volution embedded in the material in the vicinity of the middle thereof.

In testimony that I claim the foregoing as my own, I have hereto affixed my signature in the presence of two witnesses.

THOMAS JEFFERSON SPRINKLE.

Witnesses:
L. R. DUCKWALL,
FRANK COLLINS.